United States Patent [19]

Hall

[11] 4,289,464

[45] Sep. 15, 1981

[54] RETICULATED WEB MAKING APPARATUS

[75] Inventor: John N. Hall, Newark, Del.

[73] Assignee: Hercules Incorporated, Wilmington, Del.

[21] Appl. No.: 129,548

[22] Filed: Mar. 6, 1980

Related U.S. Application Data

[62] Division of Ser. No. 971,594, Dec. 20, 1978, Pat. No. 4,226,828.

[51] Int. Cl.³ .................. B29C 17/10; B29D 7/02; B29C 17/04
[52] U.S. Cl. ................................ 425/66; 425/290; 425/302.1; 425/304
[58] Field of Search ............... 425/290, 302.1, 304, 425/66, 224

[56] References Cited

U.S. PATENT DOCUMENTS

| 2,032,923 | 3/1936 | Eldridge | 264/504 |
| 2,032,942 | 3/1936 | Linscott et al. | 264/504 |
| 2,286,117 | 6/1942 | Sidnell | 264/154 |
| 2,994,108 | 8/1961 | Bjorksten | 264/DIG. 70 |
| 3,054,148 | 9/1962 | Zimmerli | 264/504 |
| 3,394,211 | 7/1968 | MacDuff | 264/154 |
| 3,682,760 | 8/1972 | Fairbanks | 264/290.2 |
| 3,753,352 | 8/1973 | McNally | 264/154 |
| 4,025,601 | 5/1977 | Keith | 264/DIG. 47 |
| 4,140,826 | 2/1979 | Liu | 428/113 |
| 4,151,240 | 4/1979 | Lucas | 264/504 |

Primary Examiner—James B. Lowe
Attorney, Agent, or Firm—Joshua W. Martin, III

[57] ABSTRACT

The invention is a process and apparatus for forming a reticulated web net oriented from a perforated film wherein the perforated film is produced by thermoforming projections or pips on an endless perforated surface and subsequently skiving the pips off flush with the film, said thermoforming, skiving and orientation all taking place in a continuous fashion.

4 Claims, 2 Drawing Figures

RETICULATED WEB MAKING APPARATUS

This is a division of application Ser. No. 971,594, filed Dec. 20, 1978, now U.S. Pat. No. 4,226,828.

BACKGROUND OF THE INVENTION

Commonly owned U.S. patent application Ser. No. 741,098, filed Nov. 11, 1976, discloses a reticulated web structure and a method for making said structure wherein small holes in a tight pattern are punched in film stock and then the film stock is biaxially oriented into a reticulated web net. Punching, however, has inherent mechanical and economic limitations when applied to high volume thruput of material. These limitations become critically prohibitive when dealing with complex configurations of small perforations. The instant invention provides a novel continuous process and apparatus for producing a perforated film and resulting net without punching said film. U.S. Pat. No. 3,054,148 to Zimmerli vacuum forms a thermoplastic net and then does selective stretching to make decorative sheets for curtains but does not rupture the sheet. U.S. Pat. No. 3,682,760 to Fairbanks discloses a patterned thermoplastic, orientable sheet which is drawn to a selective pattern or design and/or strength, but does not teach perforation of the sheet. U.S. Pat No. 2,286,117 to Sidnell discloses molding a rubber sheet with pips or nubs and then cutting them off leaving holes. The method disclosed by Sidnell is not suggestive of continuous thermoforming, but rather a batch process utilizing pins to mechanically displace material into recesses in the inner mold and therefore is analogous to manufacturing a net by hole punching. U.S. Pat. No. 2,032,923 to Eldridge discloses using gas to rupture a rubber sheet through a perforated belt. Eldridge fails to disclose the thermoforming and skiving process and apparatus which produce the precisely defined openings necessary to produce the reticulated web net. U.S. Pat. No. 3,929,155 issued to H. A. Thompson discloses sheet which is vacuum formed over conical pins to produce a sheet with protuberences. The apex of the protuberences formed could be removed by abrasion or melting to produce openings. The instant invention skives protuberences to produce clean edged holes of uniform shape that can be uniformly drawn into nets of uniform hole pattern. Abrasion leaves an irregular shaped hole and melting reinforces the edge of the hole with a collar of material detrimental to uniform orientation. The Thompson patent and the other sheet forming references mentioned above in no way suggest that their final products are suitable for orientation for production of netlike structures.

SUMMARY OF THE INVENTION

The purpose of the instant invention is to provide process and apparatus for producing a web of thermoplastic polymeric material having suitably-sized holes of round or other configuration in conjunction with subsequent orientation of the film to produce a reticulated web net. The instant invention provides such process and apparatus by thermoforming projections or pips in a film and subsequently skiving said pips off close to and parallel to the film leaving uniform holes which, when the film is oriented, produces a product substantially identical to that made from drilled or punched sheet stock.

OBJECTS OF THE INVENTION

The principal object of the instant invention is to provide a process for preparation of film in a continuous and less expensive method than that produced by the use of reciprocating punch presses. It is an object of the instant invention to provide a process which is inherently quiet and is made up of low maintenance hardware having no reciprocating functional parts.

It is also an object of the invention to provide process and apparatus which has inherently higher speed potential than a process utilizing a punch press.

It is yet another object of the instant invention to provide apparatus suited for non-round hole patterns.

DESCRIPTION OF THE PREFERRED EMBODIMENT

Figure 1:
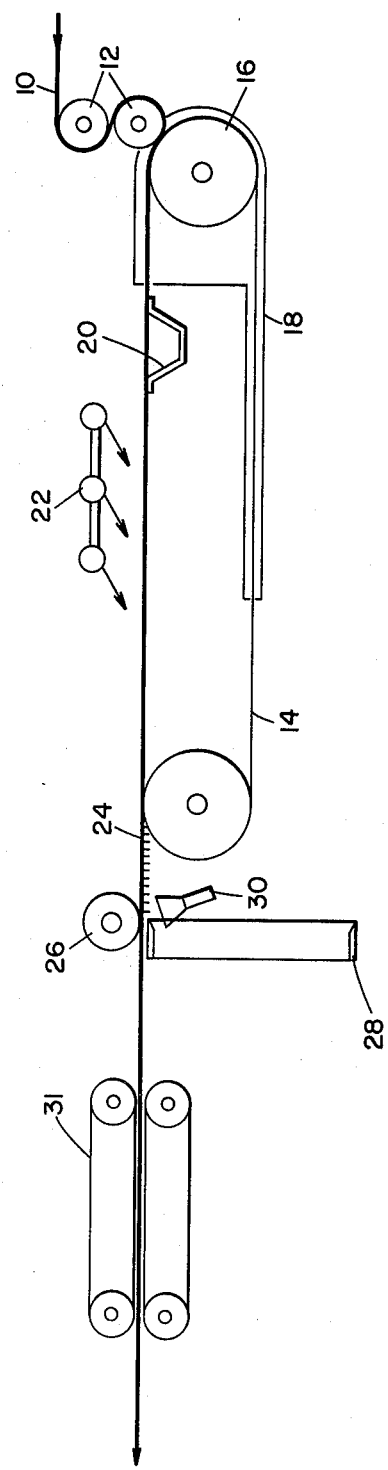
FIG. 1 is a schematic view of the apparatus of the instant invention.

With continued reference to the drawing, FIG. 1 illustrates process and apparatus for film perforation by skiving off thermoformed projections or pips. Thermoplastic polymeric film 10 is supplied to heated s-wrap rolls 12 which raise the temperature of the film to that suitable for thermoforming. The heated film is then placed in contact with a perforated continuous surface means such as stainless steel belt 14. Perforated stainless steel belt 14 is driven by drive roll 16. Belt 14 is heated prior to contact with film 10 in belt-heat oven 18. Film 10 is conveyed by belt 14 through a pressure differential means in the form of vacuum box 20. The thermoformable film 10 is drawn into the perforations of the belt 14 thus forming "pips". The film is drawn into but not through the perforations due to the pressure differential. It is within the scope of the invention to provide additional or alternative positive pressure on the other side of film 10 to force portions of the film into the perforations of the belt 14. It is important that the thickness of the belt 14 be greater than the length of the pips formed to prevent premature destruction of the pips by say the edge of the vacuum box 20 or by other portions of the conveyor mechanism. The thermoformed film 10 is then passed under cooling means 22 which hardens the film. The cooled thermoformed film 10 is then stripped at the end of conveyor roll at location 24 and passed to a skiving means such as between mandrel roll 26 and continuous razor knife 28 thus skiving the pips off parallel to the surface of the film to remove a substantial portion of the pips. Vacuum means 30 is juxtapositioned to continuous razor knife 28 to collect skived pips which may be reground and reprocessed into film 10. It is most important that the skived pips be recovered and not destroyed due to the large percentage of the material the pips represent. The perforated film thus produced is then passed through an orienting tenter and longitudinal stretcher means 31 which stretches the film into the desired reticulated web net. The finished net is then wound on rolls (not shown). Likewise, the film 10 is provided by supply rolls (not shown).

Figure 2:
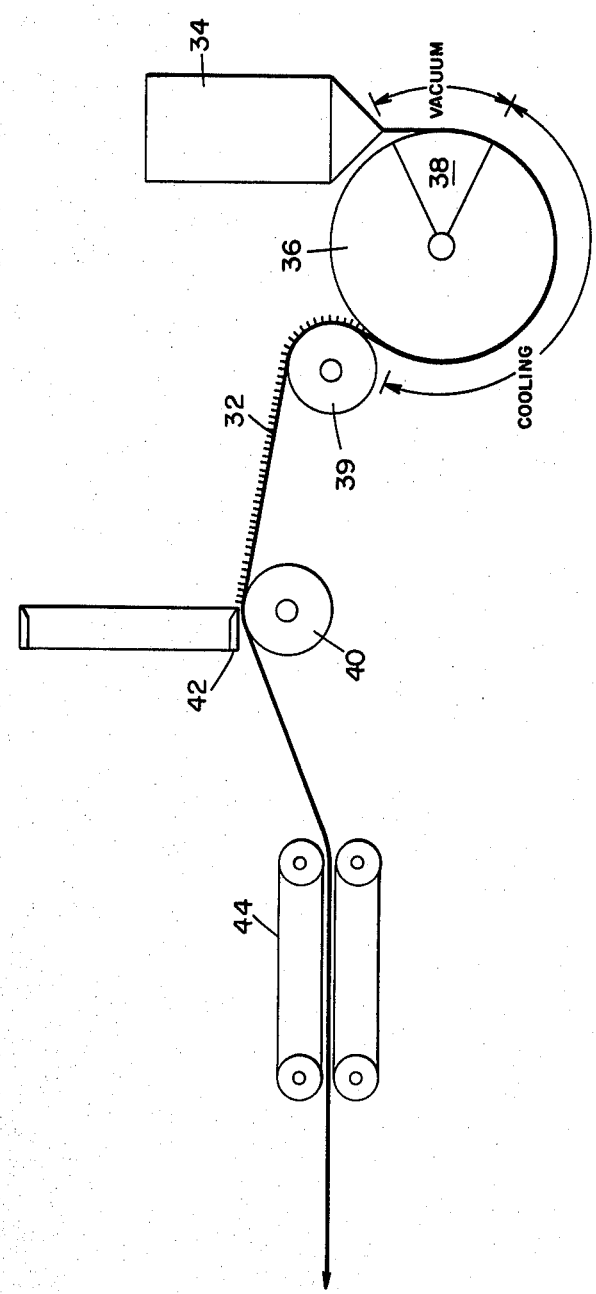
FIG. 2 is a schematic view of an alternate embodiment of the instant invention.

FIG. 2 illustrates an alternate embodiment of the instant invention wherein a film 32 is provided by direct extrusion from film supply means such as extruder head 34. Film 32 is preferably extruded vertically downwardly onto the surface of thermoforming drum 36.

Vertical extrusion eliminates the type of distortion of film in its plastic condition that occurs in horizontal extrusion. It is also within the scope of the invention to eliminate distortion by extruding film directly into contact with the surface of thermoforming drum 36. The surface of thermoforming drum 36 consists of a perforated stainless steel belt, for example, 0.050 inch holes, 133 per square inch, straight pattern, having a thickness of 20 gauge (0.037 inch). As thermoforming drum 36 revolves, it places the film in contact with a pressure differential means in the form of internal vaccum chamber 38. Again it is within the scope of the invention to provide external pressure as well as or in substitution for vacuum to thermoform. Film 32 is drawn by the vacuum into the perforations of the belt to produce pips. Thermoforming drum 36 continues to rotate and places the film in contact with cooling means in the form of chamber 37 wherein cooling is applied internally to harden the film. External cooling may also or alternatively be provided. Film 32 then passes over take-off roll 39 where it leaves the surface of thermoforming drum 36 and is conveyed to mandrel roll 40 and complementary skiving blade 42 which slices off the thermoformed pips. The film thus perforated then passes through orienting means 44 which preferably biaxially orients the film into reticulated web net. The skiving blade 42 is preferably a single bevel blade which will maintain continuity of cutting over long periods of time.

The materials that the above reticulated web net can be formed from include any thermoplastic film-forming polymer. Among these are polyethylene, polypropylene homopolymer, random copolymers of propylene containing up to 10 percent of another olefin, block copolymers of propylene containing up to 25 percent of another olefin, nylon-6, nylon-66, polyethylene terephthalate, other high molecular weight thermoplastic polyesters, and vinyl polymers such as polyvinyl chloride, polystyrene and poly(methyl methacrylate). Conjugate or bicomponent plastic sheets in which two or more different polymers are extruded together to form sheets containing layers of separate polymers are also applicable.

It is to be understood that the above description and drawings are illustrative of this invention and not in limitation thereof. As will be evident to those skilled in the art, various modifications can be made in the light of the foregoing disclosure and discussion, without departing from the spirit or scope of the disclosure or from the scope of the claims.

What I claim and desire to protect by Letters Patent is:

1. Apparatus for forming a reticulated web net comprising:
    film supply means providing a thermoplastic polymeric film in a thermoformable condition;
    perforated continuous surface means adjacent said film supply means, said film contacting the surface of said perforated continuous surface means;
    pressure differential means adjacent said perforated continuous surface means to force portions of said film into the perforations of said surface thus forming pips, wherein the thickness of said continuous surface means is greater than the length of said pips;
    cooling means positioned adjacent said pressure differential means and said perforated continuous surface means to harden said film;
    stripping means adjacent said cooling means to strip the film from said perforated continuous surface means;
    skiving means adjacent said stripping means to cut off said pips at the surface of the film thereby creating the perforated film; and
    orienting means adjacent said skiving means to biaxially orient the film into a reticulated web net.

2. A device as in claim 1 wherein said perforated continuous surface means comprises a conveyor belt having a certain thickness wherein the thickness of the belt is greater than the length of pips formed in said perforations to prevent premature destruction of the pips.

3. A device as in claim 1 wherein said perforated continuous surface means comprises a cylindrical drum mounted for rotation about a horizontal axis and said film supply means is an extruder which extrudes said film vertically downwardly onto the surface of said drum.

4. A device as in claim 3 wherein the surface of said drum has a certain thickness greater than the length of the pips formed in the perforations of said surface to prevent premature destruction of said pips.

* * * * *